(12) United States Patent
Kiku

(10) Patent No.: US 9,551,426 B2
(45) Date of Patent: Jan. 24, 2017

(54) FLUID CONTROL VALVE

(71) Applicant: Aisin Seiki Kabushiki Kaisha, Kariya-shi (JP)

(72) Inventor: Nobutaka Kiku, Okazaki (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 109 days.

(21) Appl. No.: 14/323,145

(22) Filed: Jul. 3, 2014

(65) Prior Publication Data

US 2015/0008353 A1 Jan. 8, 2015

(30) Foreign Application Priority Data

Jul. 5, 2013 (JP) ................................. 2013-141736

(51) Int. Cl.
*F16K 1/36* (2006.01)
*F16K 7/12* (2006.01)
(Continued)

(52) U.S. Cl.
CPC . *F16K 7/12* (2013.01); *F16K 1/36* (2013.01); *F16K 11/04* (2013.01); *F16K 27/02* (2013.01);
(Continued)

(58) Field of Classification Search
CPC ............... F16K 7/00; F16K 7/12; F16K 7/23; F16K 7/26; F16K 7/14; F16K 7/16; F16K 7/17; F16K 27/02; F16K 27/023; F16K 27/0245; F16K 27/0272; F16K 27/029; F16K 1/36; F16K 1/42; F16K 1/48; F16K 1/482; F16K 31/04; F16K 31/06; F16K 31/0624; F16K 31/0655; F16K 31/0665; F16K 41/00; F16K 41/03; F16K 41/10; F16K 41/106; F16K 11/04; H01M 8/04201; H01M 2220/20
(Continued)

(56) References Cited

U.S. PATENT DOCUMENTS 4,457,327 A * 7/1984 Pepper ...................... A61L 2/26
137/67
5,848,608 A * 12/1998 Ishigaki .............. F16K 31/1225
137/599.16
(Continued)

FOREIGN PATENT DOCUMENTS

DE 1 929 627 B1 2/1971
EP 2 436 963 A2 4/2012
(Continued)

OTHER PUBLICATIONS

Extended Search Report issued Nov. 20, 2014 in European Patent Application No. 14175544.7.

*Primary Examiner* — William McCalister
*Assistant Examiner* — Ian Paquette
(74) *Attorney, Agent, or Firm* — Oblon, McClelland, Maier & Neustadt, L.L.P.

(57) ABSTRACT

A fluid control valve includes: a valve housing in which a flow path having gas inlet and outlet is formed; a drive device attached to the valve housing; a valve shaft connected to an output shaft of the drive device and moving in an axial direction; and a valve body attached so as to radially extend to an axis of the valve shaft, and opening and closing the flow path by being moved with the valve shaft so that one side surface moves away from or comes into contact with a valve seat formed in the flow path, wherein the valve housing is attached to an attachment target member so that the valve shaft is tilted, and the valve body includes a wall portion corresponding to a portion where a liquid inside the flow path collects due to its weight, within a portion having (Continued)

the valve seat, and formed along an edge portion on the other side surface opposite to one side surface of the valve body.

7 Claims, 5 Drawing Sheets

(51) Int. Cl.
*F16K 11/04* (2006.01)
*F16K 27/02* (2006.01)
*H01M 8/04* (2016.01)

(52) U.S. Cl.
CPC ..... *H01M 8/04201* (2013.01); *H01M 2220/20* (2013.01)

(58) Field of Classification Search
USPC ..................... 137/59, 60, 61, 625.48, 625.49
See application file for complete search history.

(56) References Cited

U.S. PATENT DOCUMENTS

| | | | | |
|---|---|---|---|---|
| 2007/0252103 | A1* | 11/2007 | Wu | F16K 7/17 251/335.2 |
| 2008/0116408 | A1* | 5/2008 | Bruno | F16K 41/10 251/266 |
| 2011/0297255 | A1* | 12/2011 | Weingarten | F16K 17/0453 137/535 |
| 2012/0085947 | A1* | 4/2012 | Yamaguchi | F16K 31/04 251/65 |
| 2013/0092860 | A1 | 4/2013 | Kiku et al. | |
| 2013/0256574 | A1* | 10/2013 | Hoshina | F16K 7/00 251/129.17 |

FOREIGN PATENT DOCUMENTS

| | | |
|---|---|---|
| JP | 4141810 | 8/2008 |
| WO | WO 2013/006707 A1 | 1/2013 |

\* cited by examiner

FLUID CONTROL VALVE

CROSS REFERENCE TO RELATED APPLICATIONS

This application is based on and claims priority under 35 U.S.C. §119 to Japanese Patent Application 2013-141736, filed on Jul. 5, 2013, the entire contents of which are incorporated herein by reference.

TECHNICAL FIELD

This disclosure relates to a fluid control valve which controls flow of a fluid.

BACKGROUND DISCUSSION

Japanese Patent No. 4141810 (Reference 1) discloses a type of fluid control valve. As illustrated in FIG. 1 of Reference 1, the fluid control valve includes a valve housing (first and second valve bodies 11 and 12) in which a flow path (configured to have a fluid inlet path 17, a communication path 19, and a fluid outlet path 18) having a gas inlet and a gas outlet is formed, a drive device (an electromagnetic actuator 16) attached to the valve housing, a valve shaft (a plunger 16a) which is connected to an output shaft of the drive device and moves in an axial direction in the valve housing, and a valve body 15 which is attached so as to radially extend with respect to an axis of the valve shaft, and which opens and closes the flow path by being moved with the valve shaft so that one side surface moves away from or comes into contact with a valve seat (seat portion 20) formed in the flow path of the valve housing.

In the above-described fluid control valve disclosed in Reference 1, when the valve housing is attached to an attachment target member in a state where the valve shaft is tilted to a horizontal plane (for example, a state where the fluid outlet path 18 is located on a lower side in FIG. 1 of Reference 1), while the valve body is in contact with (sits on) the valve seat, a fluid (for example, water) inside the flow path collects in the lowest portion (for example, a left side of the valve seat) of the flow path in some cases as the fluid spills over an upper surface portion of the valve body. In this case, if the water freezes, there is a possibility that the fluid control valve may not open.

In order to solve this problem, a method may be considered which operates the frozen and stuck valve body by improving a drive force of the drive device. However, the method causes the drive device to be increased in size and to be very expensive in cost.

SUMMARY

Thus, a need exists for a fluid control valve which is not susceptible to the drawback mentioned above.

A first aspect of this disclosure is directed to a fluid control valve including a valve housing in which a flow path having a gas inlet and a gas outlet is formed, a drive device attached to the valve housing, a valve shaft which is connected to an output shaft of the drive device and moves in an axial direction in the valve housing, and a valve body which is attached so as to radially extend to an axis of the valve shaft, and which opens and closes the flow path by being moved with the valve shaft so that one side surface moves away from or comes into contact with a valve seat formed in the flow path of the valve housing. The valve housing is attached to an attachment target member so that the valve shaft is tilted to a horizontal plane. The valve body includes a wall portion which corresponds to a portion where a liquid inside the flow path collects due to the weight thereof, within a portion having the valve seat in the flow path of the valve housing, and which is formed along an edge portion on the other side surface opposite to one side surface of the valve body.

According to this aspect of this disclosure, when the valve housing is attached to the attachment target member in a state where the valve shaft is tilted to the horizontal plane, if the liquid (for example, water) inside the flow path collects in a portion (for example, the lowest portion) of the flow path while the valve body is in contact with (sits on) the valve seat, the wall portion formed on the other side surface (upper surface) of the valve body can prevent the collected water from spilling over an upper surface portion of the valve body (permeating onto the other side surface (upper surface) of the valve body). Accordingly, even when the collected water freezes, it is not necessary to dispose a large-sized and expensive drive device whose drive force is relatively strong. Therefore, it is possible to maintain excellent opening performance of the fluid control valve by using a small-sized and inexpensive drive device whose drive force is relatively weak as in the related art so as to operate the frozen and stuck valve body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
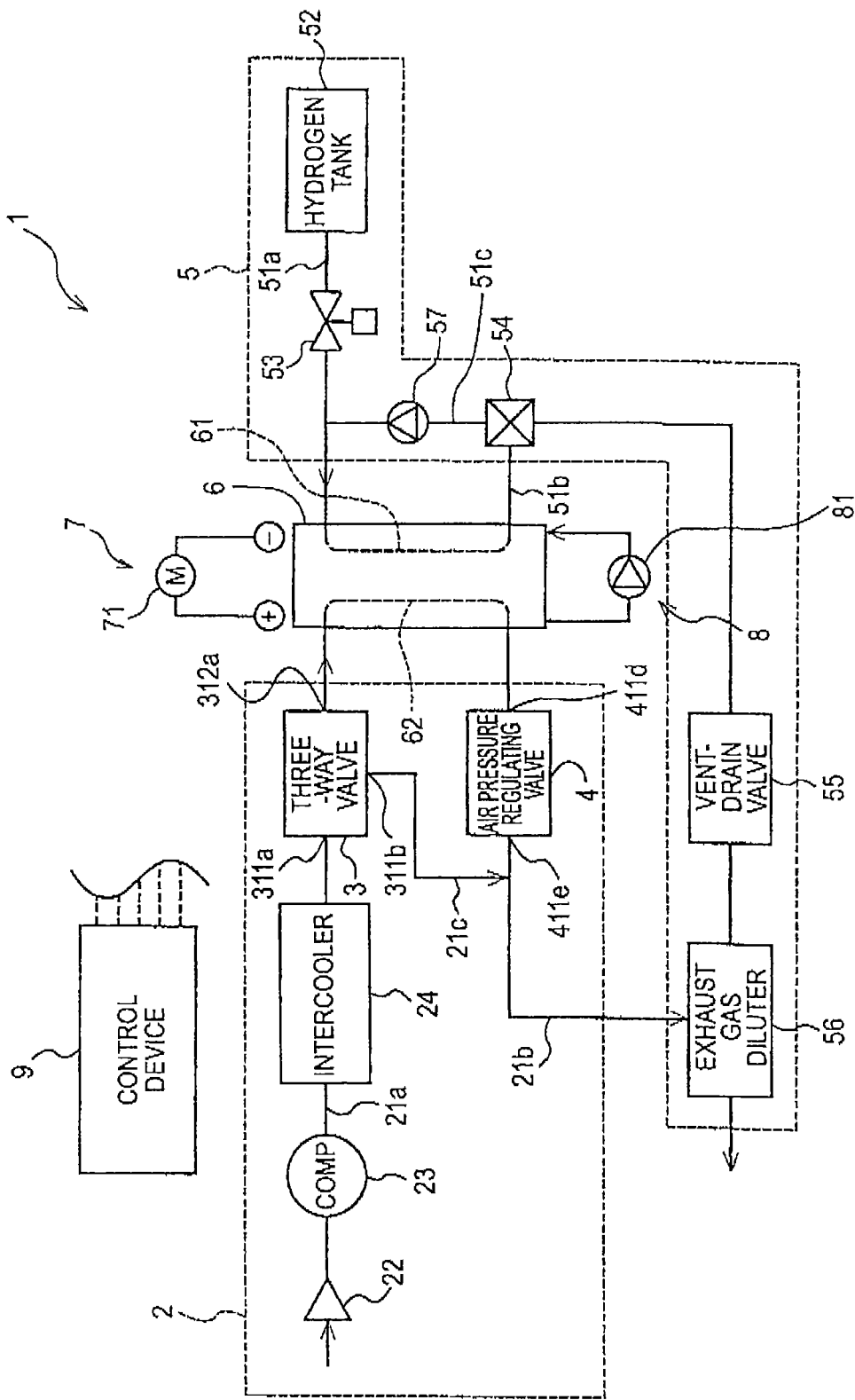
FIG. 1 is a block diagram illustrating a fuel cell system according to an embodiment disclosed here.

Hereinafter, a three-way valve 3 and an air pressure regulating valve 4 according to an embodiment disclosed here will be described with reference to FIGS. 1 to 3. As illustrated in FIG. 1, the three-way valve 3 and the air pressure regulating valve 4 (corresponding to a fluid control valve) according to an embodiment disclosed here are applied to an oxygen system 2 of a fuel cell system 1 which is mounted on a vehicle. However, without being limited thereto, the embodiment disclosed here can be widely used in an in-vehicle fluid control valve such as a fuel supply system or a hydraulic brake system, or alternatively can also be applied to a fluid control valve for household appliances or general industrial machinery.

Figure 4:
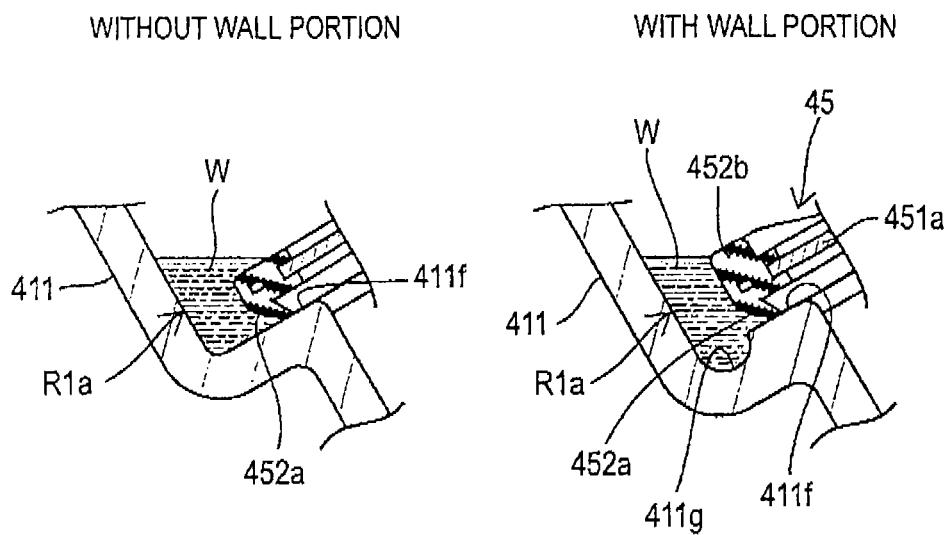
FIG. 4 is a partial cross-sectional view of the vicinity portion including a water collected portion and a wall portion for illustrating an operational effect of the air pressure regulating valve illustrated in FIG. 2, in which the left side drawing has no wall portion and the right side drawing has the wall portion.

Hereinafter, description will be made by respectively regarding an upward direction and a downward direction in FIG. 2 as the upward direction and the downward direction of the air pressure regulating valve 4, and by respectively regarding a rightward direction and a leftward direction in FIG. 2 as the rightward direction and the leftward direction of the air pressure regulating valve 4. However, the directions have no relationship with an actual attachment direction of the air pressure regulating valve 4 in a vehicle. The air pressure regulating valve 4 in the vehicle is attached to an attachment portion 11a (corresponding to an attachment target member) disposed in the vehicle so that a valve shaft 44 is tilted to a horizontal plane, that is, so that a valve member 45 is tilted to the horizontal plane as illustrated in FIG. 4.

As illustrated in FIG. 1, the fuel cell system 1 is formed from the oxygen system 2, a fuel system 5, a cell stack 6, a power system 7, a cooling system 8, and a control device 9.

Without being limited thereto, the cell stack 6 is formed by stacking multiple solid polymer type single cells one on another. The multiple single cells are electrically connected in series, and each of the single cells includes an electrolyte film, and an anode electrode and a cathode electrode which interpose the electrolyte film therebetween (both of these are not illustrated). An anode flow path 61 for supplying hydrogen gas to the anode electrode is formed in an anode separator (not illustrated) of the single cell, and a cathode flow path 62 for supplying air to the cathode electrode is formed in a cathode separator (not illustrated).

The oxygen system 2 includes an oxygen system supply pipe 21a, and the oxygen system supply pipe 21a is connected to one end of the cathode flow path 62 inside the cell stack 6. An air filter 22, an air compressor 23, an intercooler 24, and the three-way valve 3 are formed on the oxygen system supply pipe 21a, sequentially toward the cell stack 6.

One end of an oxygen system discharge pipe 21b is connected to the other end of the cathode flow path 62, and the air pressure regulating valve 4 which is a flow control valve having two ports is disposed on the oxygen system discharge pipe 21b. In addition, the above-described three-way valve 3 is a flow control valve having three ports. One end of a bypass pipe 21c is connected to the three-way valve, and the other end of the bypass pipe 21c is connected to a downstream side portion (side to which the cell stack 6 is not connected) with respect to the air pressure regulating valve 4 of the oxygen system discharge pipe 21b.

On the other hand, in the fuel system 5, a hydrogen tank 52 is connected to one end of a fuel system supply pipe 51a, and a shutoff valve 53 is formed on the fuel system supply pipe 51a. The other end of the fuel system supply pipe 51a is connected to one end of the anode flow path 61 inside the cell stack 6. A fuel system discharge pipe 51b is connected to the other end of the anode flow path 61, and a gas-liquid separator 54, a vent-drain valve 55, and an exhaust gas diluter 56 are formed on the fuel system discharge pipe 51b, sequentially from a side close to the cell stack 6. The other end of the above-described oxygen system discharge pipe 21b is connected to the exhaust gas diluter 56.

The gas-liquid separator 54 is connected to a connection portion between the shutoff valve 53 on the fuel system supply pipe 51a and the anode flow path 61 via a fuel system circulation path 51c. A circulation pump 57 is disposed on the fuel system circulation path 51c, and hydrogen gas is circulated from the gas-liquid separator 54 toward the anode flow path 61.

The power system 7 includes an electric motor 71 for driving the vehicle. The electric motor 71 is connected to a positive electrode and a negative electrode of the cell stack 6, and is driven by power generation of the cell stack 6.

The cooling system 8 includes a cooling pump 81, and cools the cell stack 6 by circulating cooling water into the cell stack 6.

The control device 9 is electrically connected to the air compressor 23, the three-way valve 3, the air pressure regulating valve 4, the shutoff valve 53, the circulation pump 57, and the cooling pump 81. Based on a required amount of power generation of the cell stack 6 which is calculated according to a driving state of the vehicle, the control device 9 controls an operation of these respective configuring elements.

If the above-described configuration causes the vehicle to start driving, the control device 9 operates the air compressor 23 and supplies the air to the cathode flow path 62. The control device 9 operates the shutoff valve 53 and the circulation pump 57 and supplies the hydrogen gas to the anode flow path 61, thereby generating the power in the cell stack 6.

In the oxygen system 2, the oxygen containing air sucked via the air filter 22 is compressed in the air compressor 23, and then is cooled by the intercooler 24. The three-way valve 3 displaces a position of the valve member according to the amount of power generation in the cell stack 6, divides the air supplied from the intercooler 24, and releases the air to the bypass pipe 21c, thereby controlling a flow rate of the air supplied to the cell stack 6.

The air pressure regulating valve 4 regulates a discharge amount of the air remaining inside the cell stack 6 by adjusting an opening degree thereof, thereby controlling pressure inside the cell stack 6.

Hydrogen off-gas (fuel gas off-gas) discharged from the anode flow path 61 contains hydrogen gas which is not used in the power generation and the water (steam) generated by the power generation. The gas-liquid separator 54 has a function of separating the hydrogen gas and the water. The hydrogen gas separated by the gas-liquid separator 54 is circulated by being supplied to the fuel system supply pipe 51a via the fuel system circulation path 51c by the circulation pump 57. The water (liquid) separated by the gas-liquid separator 54 is fed to the exhaust gas diluter 56 together with the hydrogen gas when the vent-drain valve 55 is in an opened state. The hydrogen gas discharged from the gas-liquid separator 54 to the exhaust gas diluter 56 is diluted in the exhaust gas diluter 56 by the air supplied from the oxygen system discharge pipe 21b, and then is discharged outward together with the water.

Next, a structure of the air pressure regulating valve 4 will be described in detail. As illustrated in FIG. 2, the air pressure regulating valve 4 is formed so that a motor assembly 42 (corresponding to a drive device) is attached to an outer peripheral surface of a valve housing 41. The valve housing 41 is formed so that a valve body 411 formed of a synthetic resin material such as polyphenylene sulfide and a valve cover 412 integrally formed of a metal plate are coupled to each other. The embodiment disclosed here employs the motor assembly 42 using the electric motor as the drive device. However, the embodiment disclosed here may employ a solenoid actuator or an actuator driven by gas pressure.

A metallic cover attachment sleeve 411a for attaching the valve cover 412 is inserted into the valve body 411. In addition, a metallic sleeve 411c for attaching the air pressure regulating valve 4 to the vehicle is inserted into a flange portion 411b of the valve body 411. A female screw is formed on an inner peripheral surface of the cover attachment sleeve 411a and the metallic sleeve 411c.

The flange portion 411b is screwed to the attachment portion 11a of the vehicle. In this case, as illustrated in FIG. 4, the valve body 411 is attached to the attachment portion 11a so that the valve shaft 44 is tilted to the horizontal plane, that is, so that the valve member 45 is tilted to the horizontal plane.

Figure 2:
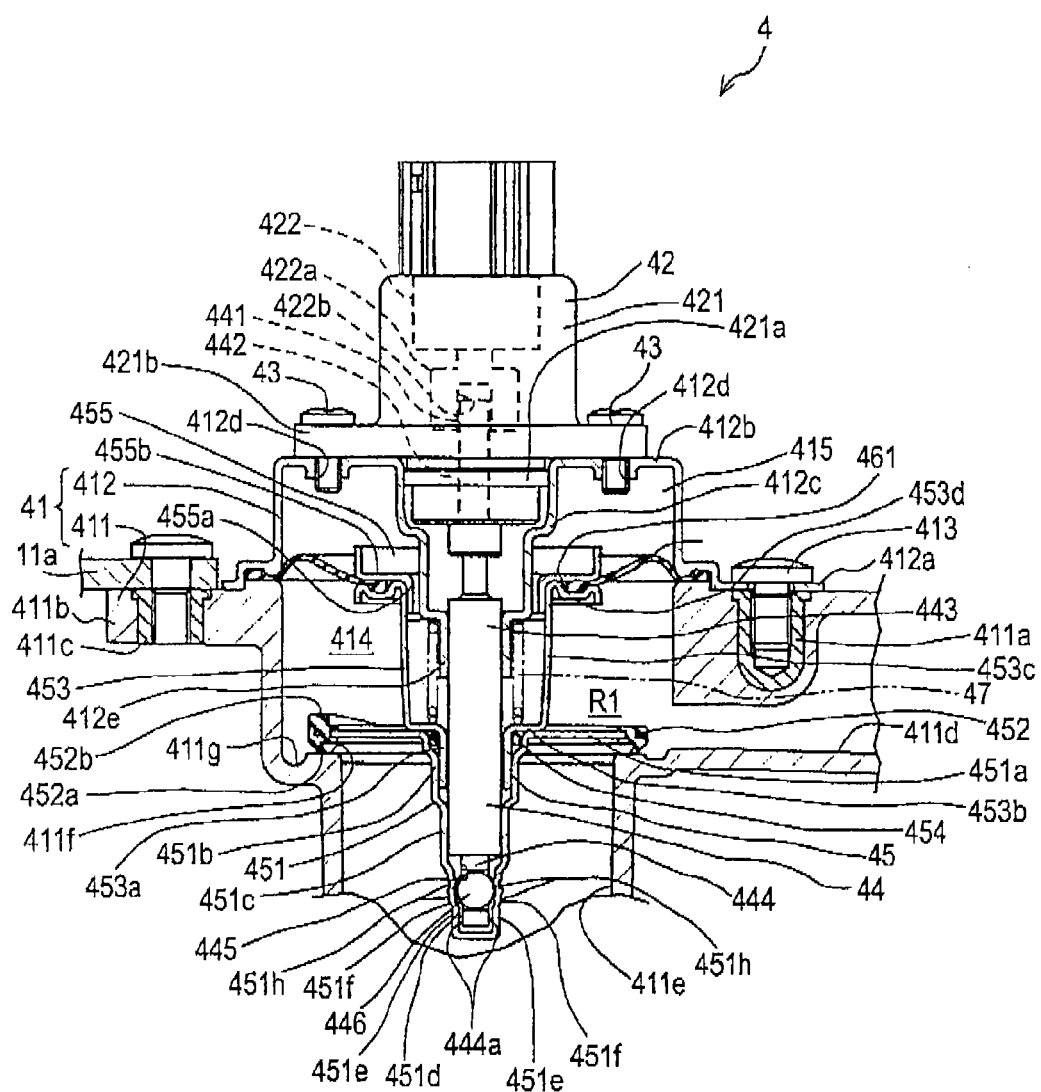
FIG. 2 is a partial cross-sectional view of an air pressure regulating valve illustrated in FIG. 1 in a close state.

A pressure regulating valve inlet 411d (corresponding to an inlet) which opens rightward in FIG. 2 is formed in the valve body 411. The pressure regulating valve inlet 411d is connected to the other end of the cathode flow path 62 of the cell stack 6 via the above-described oxygen system discharge pipe 21b (refer to FIG. 1). In addition, a pressure regulating valve outlet 411e (corresponding to an outlet) which opens in a direction perpendicular to the pressure regulating valve inlet 411d (opens downward in FIG. 2) is formed in the valve body 411. The pressure regulating valve outlet 411e is connected to the exhaust gas diluter 56 via the above-described oxygen system discharge pipe 21b. A flow path from the pressure regulating valve inlet 411d to the pressure regulating valve outlet 411e is a flow path R1 (corresponding to a flow path).

Furthermore, a pressure regulating valve seat 411f (corresponding to a valve seat) is formed between the pressure regulating valve inlet 411d and the pressure regulating valve outlet 411e, on the inner peripheral surface of the valve body 411. The pressure regulating valve seat 411f is formed in a flat annular shape. In addition, a groove 411g is formed on the outer periphery of the pressure regulating valve seat 411f, over the entire periphery.

The valve cover 412 is attached to an upper end surface of the valve body 411 by fastening a penetrating attachment bolt 413 to the cover attachment sleeve 411a. The valve cover 412 is formed from an attachment surface 412a to the valve body 411, a motor attachment portion 412b protruding upward from the attachment surface 412a, and a shaft accommodation portion 412c which descends in a stepped shape in a central portion of the motor attachment portion 412b and whose lower end portion is open. In addition, multiple female screw holes 412d are disposed on an upper surface of the motor attachment portion 412b. The valve cover 412 is configured so that the attachment surface 412a, the motor attachment portion 412b, and the shaft accommodation portion 412c which are described above are integrally formed by press-molding of a metal plate.

The above-described motor assembly 42 is attached to the upper surface of the motor attachment portion 412b. The motor assembly 42 is fixed to the valve cover 412 in such a manner that multiple attachment screws 43 penetrating an attachment flange 421b are fastened to the female screw holes 412d of the motor attachment portion 412b in a state where an outer peripheral surface of a mechanism accommodation portion 421a of a motor case 421 is fitted to an inner peripheral surface of the shaft accommodation portion 412c. The attachment screw 43 is loosely fitted to a through-hole (not illustrated) formed in the attachment flange 421b. The positioning of the valve cover 412 is performed by the inner peripheral surface of the shaft accommodation portion 412c coming into contact with the outer peripheral surface of the mechanism accommodation portion 421a.

A stepping motor 422 is fixed to an inner wall of the motor case 421. A distal end of an output shaft 422a (corresponding to an output shaft) of the stepping motor 422 has a cylindrical shape, and a drive hole 422b is formed in an axial center portion thereof. A female screw having a predetermined length is formed on an inner peripheral surface of the drive hole 422b, and is screwed to a male screw portion 441 formed on an outer peripheral surface of an end portion of the valve shaft 44 (corresponding to a valve shaft).

The valve shaft 44 is formed of a metallic material such as stainless steel, and a width-across-flat portion 442 is formed below the male screw portion 441 thereof. The width-across-flat portion 442 engages with a pair of opposing surfaces (not illustrated) formed in a lower end portion of the motor case 421. In this manner, the valve shaft 44 is not rotatable with respect to the motor case 421. Therefore, if the output shaft 422a of the stepping motor 422 is rotated in one direction, the valve shaft 44 descends in the axial direction inside the valve housing 41. If the output shaft 422a is rotated in the opposite direction, the valve shaft 44 ascends.

The male screw portion 441 of the valve shaft 44 and the female screw of the output shaft 422a which are described above are formed of a trapezoidal-shaped screw. It is desirable that a reverse efficiency between the valve shaft 44 and the output shaft 422a be set to substantially zero. In this manner, the valve shaft 44 and the output shaft 422a are formed so that transmission of the operations therebetween is irreversible. When a return load is applied from the valve shaft 44 to the output shaft 422a in a state where the air pressure regulating valve 4 is closed, the output shaft 422a is not rotated in a valve opening direction. Accordingly, there is no possibility that the air pressure regulating valve 4 is accidentally opened.

As illustrated in FIG. 2, a column portion 443 which protrudes from the motor case 421 and axially extends with a constant diameter is formed below the width-across-flat portion 442 of the valve shaft 44. An outer peripheral surface of the column portion 443 is supported so as to be axially movable by a shaft retainer portion 412e formed in a lower end of the shaft accommodation portion 412c of the valve cover 412. Electroless nickel plating is applied to the outer peripheral surface of the column portion 443 or the shaft retainer portion 412e which come into contact with each other, thereby improving wear resistance on a sliding surface thereof.

Furthermore, a connection portion 444 formed to have a diameter smaller than that of the column portion 443 is integrally formed in a distal end portion of the column portion 443. The connection portion 444 is formed in a width-across-flat shape having a pair of flat surfaces 444a opposing each other on the outer peripheral surface.

A ball hole 445 penetrates the connection portion 444 in a direction orthogonal to the axis. Both end portions of the ball hole 445 are respectively open so as to be orthogonal to the opposing flat surfaces 444a. A steel ball 446 is arranged inside the ball hole 445. A diameter of the steel ball 446 is set to be larger than a distance between the respective flat surfaces 444a (thickness of the width-across-flat). The steel ball 446 protrudes from both end portions of the ball hole 445. In addition, the diameter of the steel ball 446 is slightly smaller than the diameter of the ball hole 445. The steel ball 446 is accommodated so as to be rotatable inside the ball hole 445 and so as to be movable inside the ball hole 445 in the axial direction of the ball hole 445.

The valve member 45 (corresponding to a valve body) is attached to the steel ball 446 formed in a distal end portion of the valve shaft 44 so as to radially extend with respect to the axis of the valve shaft 44. A valve frame 451 of the valve member 45 is formed by press-molding of a metal plate such as stainless steel. The valve frame 451 has a flat plate portion 451a which radially extends to the axis of the valve shaft 44 in a disk shape. A seal member 452 fixedly adheres to the flat plate portion 451a so as to cover an outer peripheral edge.

The seal member 452 is formed of a synthetic rubber material such as styrene-butadiene rubber (SBR) or ethylene-propylene-diene copolymer (EPDM). A seal lip 452a which can come into contact with the pressure regulating valve seat 411f formed in the valve body 411 in response to descending of the valve member 45 protrudes on a lower surface (corresponding to one side surface) of the seal member 452. As illustrated in FIG. 2, the seal lip 452a is formed in a lip shape in cross section. This seal lip 452a is formed radially inward (toward the pressure regulating valve outlet 411e) so that when the power generation is stopped, self-sealing is performed by negative pressure generated through condensation of residual vapor which is caused by reaction between the hydrogen gas and the oxygen which remain inside the cell stack 6 or a temperature decrease in the cell stack 6.

Furthermore, a wall portion 452b is formed on an upper surface (corresponding to the other side surface opposite to one side surface) of the seal member 452. The wall portion 452b is formed in an upper surface edge portion of the seal member 452 corresponding to a portion R1a where the liquid inside the flow path R1 collects due to the weight thereof, within a portion having the pressure regulating valve seat 411f in the flow path R1 of the valve housing 41. When an attachment position (attachment angle) of the air pressure regulating valve 4 is determined in advance, it is preferable to form the wall portion 452b in a place corresponding to (coping with) the portion R1a where the water collects when the vehicle is parked on a horizontal plane.

A stepped portion 451b which is continuous with a center portion in the radial direction of the flat plate portion 451a is formed in the valve frame 451. The stepped portion 451b extends in the axial direction of the valve shaft 44, and is formed at two places so that radial step differences are arrayed side by side in the axial direction.

The valve frame 451 has a cylindrical portion 451c whose one end is continuous with the stepped portion 451b. The cylindrical portion 451c extends in a direction perpendicular to the flat plate portion 451a, and the column portion 443 of the valve shaft 44 is inserted into the cylindrical portion 451c. Furthermore, the valve frame 451 has an attachment portion 451d which is formed to be continuous with the other end of the cylindrical portion 451c and whose distal end is closed in a bag shape so as to be capable of accommodating the connection portion 444 of the valve shaft 44.

The attachment portion 451d has a pair of stationary walls 451e so as to respectively oppose the flat surfaces 444a of the connection portion 444 when the connection portion 444 of the valve shaft 44 is accommodated. A fitting portion 451f which can accommodate the steel ball 446 when the connection portion 444 is inserted into the attachment portion 451d protrudes from the respective stationary walls 451e. In addition, a pair of opposing connection surfaces (not illustrated) is formed in the attachment portion 451d so as to connect the stationary walls 451e to each other.

The distance between both inner peripheral surfaces of the stationary walls 451e is set to be longer than the distance (thickness of the width-across-flat) between the flat surfaces 444a of the connection portion 444. The distance between both inner peripheral surfaces of the connection surface portions is set to be longer than the distance between side surface portions 444b of the connection portion 444.

When the valve frame 451 is attached to the valve shaft 44, the connection portion 444 is inserted into the attachment portion 451d so that the steel ball 446 protruding from the flat surface 444a is accommodated inside the fitting portion 451f in a state where the steel ball 446 is arranged inside the ball hole 445. Thereafter, a caulking portion 451h is formed by caulking both of the stationary walls 451e with respect to the steel ball 446, and the attachment portion 451d is fixed to the steel ball 446.

In a state where the valve frame 451 is attached to the valve shaft 44, a gap $\epsilon$ in the radial direction (hereinafter, referred to as a radial gap $\epsilon$) with respect to the axis of the valve shaft 44 is formed between the inner peripheral surface of the cylindrical portion 451c and the outer peripheral surface of the column portion 443 of the inserted valve shaft 44. The radial gap $\epsilon$ is formed over the entire periphery, between the inner peripheral surface of the cylindrical portion 451c and the outer peripheral surface of the column portion 443. The valve member 45 is formed to be tiltable to the valve shaft 44 since the radial gap $\epsilon$ is disposed.

As illustrated in FIG. 2, a spring retainer 453 is press-fitted from above, on an inner peripheral surface of the stepped portion 451b of the valve frame 451. The spring retainer 453 is formed so that a metal plate is squeezed through a pressing process. The spring retainer 453 has a cylindrical fixing portion 453a located between a step formed below the stepped portion 451b and the column portion 443, and a shoulder portion 453b extending radially outward from the fixing portion 453a.

The fixing portion 453a of the spring retainer 453 is press-fitted to the inner peripheral surface of the stepped portion 451b of the valve frame 451 until the shoulder portion 453b comes into contact with the upper surface of the flat plate portion 451a of the valve frame 451. The fixing portion 453a press-fitted to the stepped portion 451b has a gap between the fixing portion 453a and the outer peripheral surface of the column portion 443 of the valve shaft 44. Therefore, there is no possibility of hindering the valve member 45 from being tilted to the valve shaft 44.

An O-ring 454 serving as a seal member is interposed between a step formed above the stepped portion 451b and the fixing portion 453a. The O-ring 454 demonstrates a sealing function between the valve frame 451 and the fixing portion 453a so as to prevent moisture or foreign matter permeating the air pressure regulating valve 4 from permeating the attachment portion 451d of the valve frame 451 or an air chamber 415 separated by a diaphragm 46 (to be described later).

Furthermore, the spring retainer 453 includes a connection portion 453c extending upward from the shoulder portion 453b, and a fastening portion 453d extending radially outward from the connection portion 453c.

A diaphragm holder 455 has an engagement portion 455a extending in the axial direction of the valve shaft 44 in a radially inner end. A pressing portion 455b radially extends from an upper end of the engagement portion 455a. Until the lower surface of the pressing portion 455b comes into contact with the upper end of the connection portion 453c of the spring retainer 453, the engagement portion 455a is press-fitted to the inner peripheral surface of the connection portion 453c. In this manner, the spring retainer 453 and the diaphragm holder 455 are integrated with each other.

An inner peripheral edge of the diaphragm 46 is fixed between the fastening portion 453d of the spring retainer 453 and the pressing portion 455b of the diaphragm holder 455. The diaphragm 46 is integrally formed of a synthetic rubber material, and a mounting hole 461 penetrating the front and rear sides is formed in a substantially center portion thereof. A peripheral edge of the mounting hole 461 is vertically pinched by the fastening portion 453d and the pressing portion 455b, and is fixed between both of these in a liquid-tight manner.

An outer peripheral edge of the diaphragm 46 is pinched between the upper end surface of the above-described valve body 411 and the lower end of the motor attachment portion 412b of the valve cover 412, thereby being fixed in the liquid-tight manner. As described above, the diaphragm 46 is attached to the inner peripheral surface of the valve housing 41 and the valve member 45. In this manner, the inside of the valve housing 41 is divided into two sections by the diaphragm 46 and the valve member 45. That is, the inside of the valve housing 41 has a fluid chamber 414 which includes the pressure regulating valve inlet 411d, the pressure regulating valve outlet 411e, and the pressure regulating valve seat 411f, and through which the supplied fluid (gas) passes, and the air chamber 415 where the fluid is prevented from entering and is filled with air. The air chamber 415 communicates with outside air through a vent hole (not illustrated) disposed in the valve cover 412.

The diaphragm 46 moves with the valve member 45. One side of the diaphragm 46 is configured to include the flow path R1 and the valve seat 411f, and faces the fluid chamber 414 in which the fluid (gas) is circulated. The other side of the diaphragm 46 faces the air chamber 415 where the fluid (gas) is prevented from entering and is open to the atmosphere. Furthermore, an effective pressure receiving area of the diaphragm 46 is configured to be larger than an effective pressure receiving area of the valve member 45.

A coil spring 47 is interposed so as to circumferentially surround the valve shaft 44, between the shoulder portion 453b of the spring retainer 453 and the stepped portion of the shaft accommodation portion 412c of the valve cover 412. The coil spring 47 is elastically mounted between the spring retainer 453 and the valve cover 412, and biases the valve member 45 in a distal end direction of the valve shaft 44.

If a fluid having predetermined pressure such as air is supplied from the pressure regulating valve inlet 411d into the valve housing 41, the above-described diaphragm 46 receives the pressure from the fluid, and an upper portion of the valve member 45 is evenly pulled on the circumference by the diaphragm 46, does not deviate from the axis of the valve shaft 44 (centering), and is held without being tilted to the axis of the valve shaft 44.

A biasing force applying in the distal end direction of the valve shaft 44 of the above-described coil spring 47 causes a lower portion of the valve member 45 to be held without deviating from the axis of the valve shaft 44 (centering), and without being tilted to the axis of the valve shaft 44. Instead of being disposed between the spring retainer 453 and the valve cover 412, the coil spring 47 may be interposed between the pressing portion 455b of the diaphragm holder 455 and the valve cover 412.

Next, an operation of the air pressure regulating valve 4 will be described. When the valve shaft 44 is present above and the seal member 452 of the valve member 45 is spaced (separated) away from the pressure regulating valve seat 411f, the air pressure regulating valve 4 is in an opened state (not illustrated). In this state, the pressure regulating valve inlet 411d and the pressure regulating valve outlet 411e communicate with each other, and circulation of the fluid such as the air is allowed therebetween.

If the stepping motor 422 is rotated in one direction by a drive signal transmitted from the control device 9, the valve member 45 descends in the axial direction together with the valve shaft 44, and the seal member 452 sits on (comes into contact with; refer to FIG. 2) the pressure regulating valve seat 411f. This causes the air pressure regulating valve 4 to be in a closed state, the communication between the pressure regulating valve inlet 411d and the pressure regulating valve outlet 411e to be blocked, and the circulation of the fluid (gas) to be blocked therebetween. That is, in the air pressure regulating valve 4, the output shaft 422a of the motor assembly 42 is positioned at and fixed to a valve closed position. In this manner, a state is maintained where the valve member 45 comes into contact with the valve seat 411f and thus the flow path R1 of the valve housing 41 is closed.

Furthermore, an operation of the air pressure regulating valve 4 when being frozen will be described with reference to FIG. 4. The left side drawing illustrates the air pressure regulating valve 4 without the wall portion 452b, and the right side drawing illustrated the air pressure regulating valve 4 with the wall portion 452b. Both drawings illustrate a state where the air pressure regulating valve 4 (valve shaft 44) illustrated in FIG. 2 is tilted to the left side and is attached to the vehicle.

If the fuel cell system 1 of the vehicle is stopped, the cathode flow path 62 of the cell stack 6 is in a wet state, and the condensed water of the water vapor in the cathode flow path 62 is generated as water droplets on an inner wall surface of the flow path R1. In order to discharge the water droplets from the flow path R1, air scavenging for injecting a large amount of air at once is performed. However, all the water droplets cannot be discharged, and in some cases, the water droplets adhere to the wall surface of the flow path R1 after the air scavenging. While the fuel cell system is stopped, the water droplets present inside the flow path R1 after the air scavenging are caused to flow toward the lower portion in the flow path R1 due to the weight thereof, and are collected at the water collected portion R1a.

In this case, when the wall portion 452b is not formed as illustrated on the left side in FIG. 4, water W collected in the water collected portion R1a permeates onto at least a portion of the upper surface of the valve member 45, that is, the upper surface of the valve frame 451 and the seal member 452. That is the water W covers a portion of the upper surface of the valve member 45.

If in this state, an ambient temperature becomes low and the water W collected in the water collected portion R1a freezes, the portion on the upper surface of the valve member 45 becomes covered with ice.

On the other hand, when the wall portion 452b is formed as illustrated on the right side in FIG. 4, the wall portion 452b does not allow the water W collected in the water collected portion R1a to permeate onto the upper surface of the valve member 45, that is, the upper surface of the valve frame 451 and the seal member 452. That is, it is possible to prevent the water W from covering the upper surface of the valve member 45. Therefore, even when the ambient temperature becomes low and the water W collected in the water collected portion R1a freezes, it is possible to prevent the upper surface of the valve member 45 from being covered with ice.

Accordingly, it is not necessary to dispose a large-sized and expensive drive device whose drive force is relatively strong. Therefore, it is possible to maintain excellent opening performance of the air pressure regulating valve 4 (fluid control valve) by using a small-sized and inexpensive drive device whose drive force is relatively weak as in the related art so as to operate the frozen and stuck valve member 45.

Figure 5:
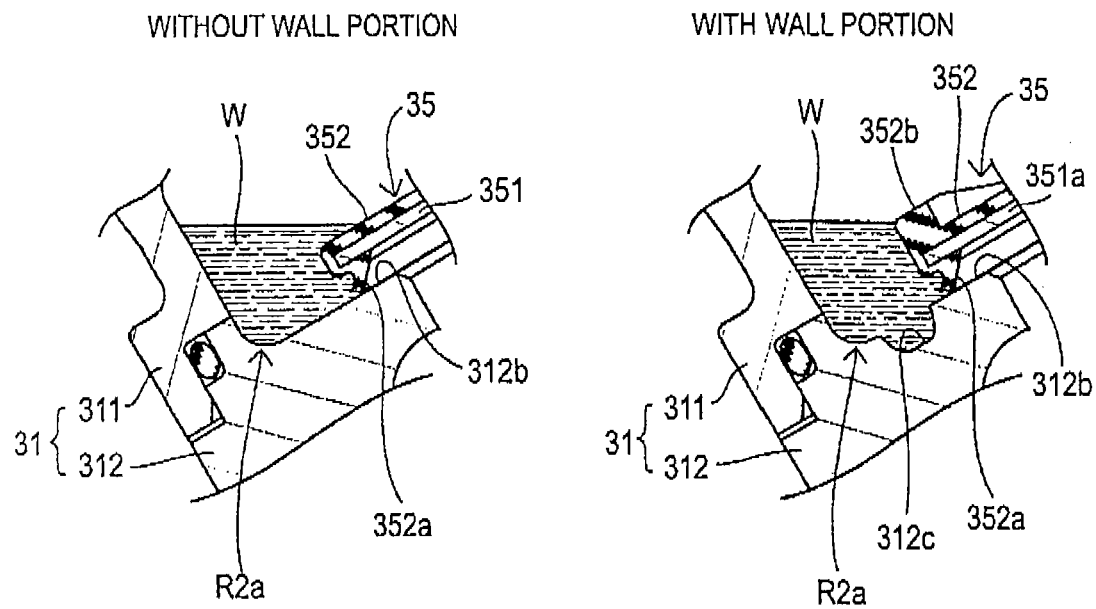
FIG. 5 is a partial cross-sectional view of the vicinity portion including the water collected portion and the wall portion for illustrating an operational effect of the three-way valve illustrated in FIG. 3, in which the left side drawing has no wall portion and the right side drawing has the wall portion.

Next, a structure of the three-way valve 3 (corresponding to a fluid control valve) will be described in detail with reference to FIG. 3. Hereinafter, description will be made by respectively regarding an upward direction and a downward direction in FIG. 3 as the upward direction and the downward direction of the three-way valve 3, and by respectively regarding a rightward direction and a leftward direction in FIG. 3 as the rightward direction and the leftward direction of the three-way valve 3. However, the directions have no relationship with an actual attachment direction of the three-way valve 3 in the vehicle. The three-way valve 3 in the vehicle is attached to an attachment portion (corresponding to an attachment target member; not illustrated) disposed in the vehicle so that a valve shaft 33 is tilted to a horizontal plane, that is, so that a valve member 35 is tilted to the horizontal plane as illustrated in FIG. 5.

Figure 3:
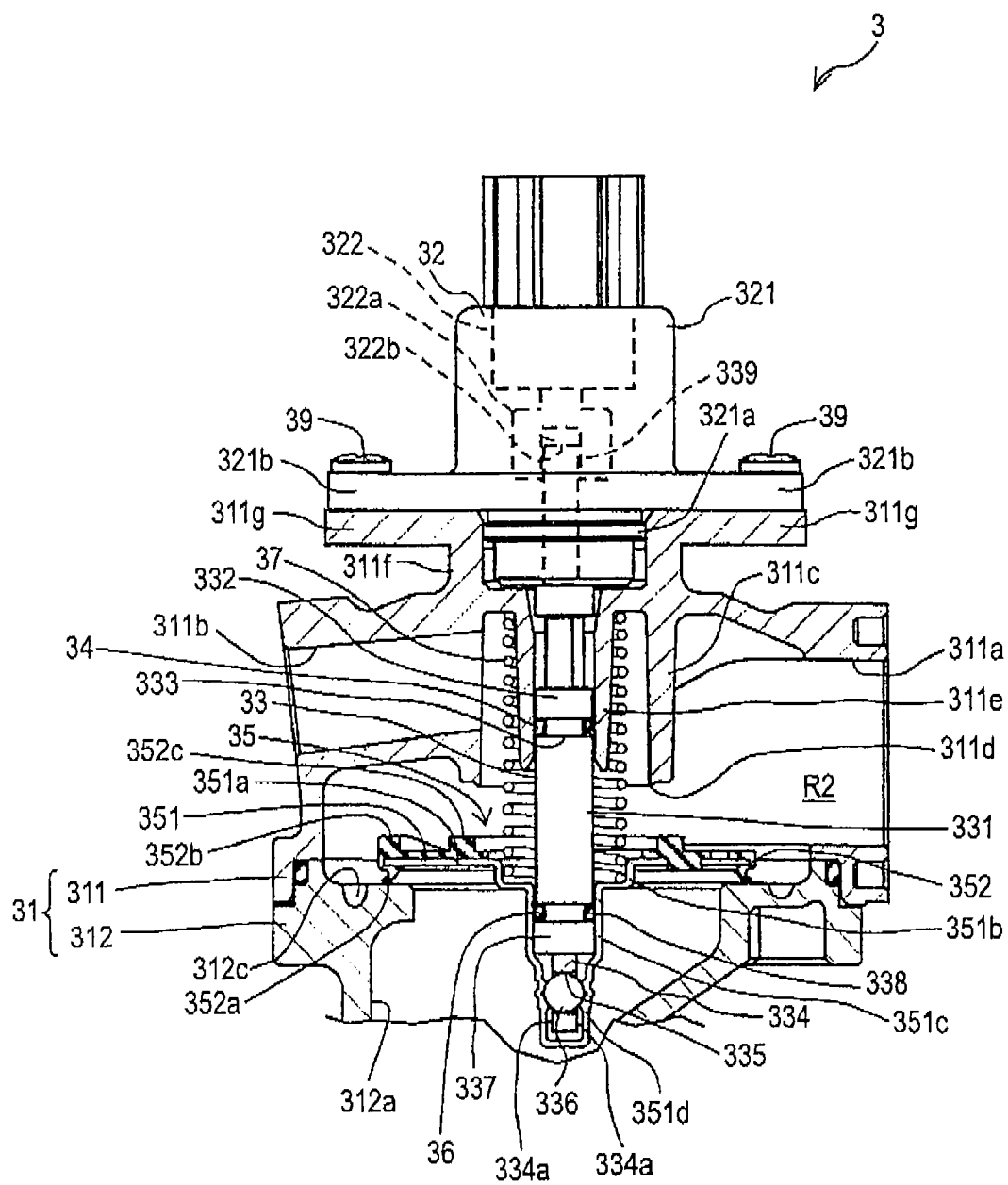
FIG. 3 is a partial cross-sectional view of a three-way valve illustrated in FIG. 1 in a close state.

As illustrated in FIG. 3, similar to the air pressure regulating valve 4, the three-way valve 3 is also formed so that a motor assembly 32 (corresponding to a drive device) is attached to the outer peripheral surface of the valve housing 31. The valve housing 31 is formed so that a first body 311 and a second body 312 which are formed of a synthetic resin material such as polyphenylene sulfide are fitted to each other in a liquid-tight manner.

A three-way valve inlet 311a (corresponding to an inlet) which opens rightward in FIG. 3 is formed in the first body 311. The three-way valve inlet 311a is connected to the intercooler 24 via the above-described oxygen system supply pipe 21a (refer to FIG. 1). In addition, a three-way valve outlet 312a (corresponding to an outlet) which opens in a direction perpendicular to the three-way valve inlet 311a (opens downward in FIG. 3) is formed in the second body 312. The three-way valve outlet 312a is connected to one end of the cathode flow path 62 of the cell stack 6 via the above-described oxygen system supply pipe 21a (refer to FIG. 1). A flow path from the three-way valve inlet 311a to the three-way valve outlet 312a is a flow path R2 (corresponding to a flow path).

A bypass port 311b which opens leftward in FIG. 3 is formed in the first body 311. The bypass port 311b is connected to the exhaust gas diluter 56 via the above-described bypass pipe 21c (refer to FIG. 1).

A control valve seat 312b (corresponding to a valve seat) is formed on the inner peripheral surface of the second body 312, between the three-way valve inlet 311a and the three-way valve outlet 312a. The control valve seat 312b is formed in a flat annular shape. In addition, a groove 312c is formed on the outer periphery of the control valve seat 312b, over the entire periphery.

A cylindrical seat body 311c extends downward from an inner upper surface of the first body 311. A low end of the seat body 311c is formed to be flat, and a bypass valve seat 311d located between the three-way valve inlet 311a, the three-way valve outlet 312a and the bypass port 311b is formed in the low end of the seat body 311c. In addition, a cylindrical shaft support portion 311e protrudes from an inner peripheral upper surface of the first body 311 so as to be located radially inward of the seat body 311c.

Similar to the above-described air pressure regulating valve 4, the above-described motor assembly 32 is attached to the upper surface of the valve housing 31. The motor assembly 32 is fixed to the first body 311 by fastening multiple attachment screws 39 penetrating the motor case 321 to a fixing portion 311g of the first body 311 in a state where an outer peripheral surface of a mechanism accommodation portion 321a of the motor case 321 is fitted to an inner peripheral surface of a motor attachment boss 311f formed in an upper end portion of the first body 311. The attachment screw 39 is loosely fitted to a through-hole (not illustrated) formed in a fixing portion 321b of the motor case 321. The positioning of the motor assembly 32 is performed by the inner peripheral surface of the motor attachment boss 311f coming into contact with the outer peripheral surface of the mechanism accommodation portion 321a.

The fixing portion 311g of the first body 311 is a flange portion which extends outward from an opening end of the motor attachment boss 311f. The fixing portion 321b of the motor case 321 is attached to the fixing portion 311g disposed in the valve housing 31.

Similar to the air pressure regulating valve 4, a stepping motor 322 is fixed inside the motor case 321. Rotary motion of an output shaft 322a (corresponding to an output shaft) of the stepping motor 322 is converted into linear motion to be transmitted to the valve shaft 33 (corresponding to a valve shaft). A distal end of the output shaft 322a of the stepping motor 322 has a cylindrical shape, and a drive hole 322b is formed in an axial center portion thereof. A female screw having a predetermined length is formed on an inner peripheral surface of the drive hole 322b, and is screwed to a male screw portion 339 formed on an outer peripheral surface of an end portion of the valve shaft 33.

The valve shaft 33 is supported so as to be movable in the axial direction on the inner peripheral surface of the above-described shaft support portion 311e.

A cylindrical portion 331 axially extending with a constant diameter is formed in a substantially center portion in a longitudinal direction of the valve shaft 33. In addition, a first land portion 332 having a diameter the same as that of the cylindrical portion 331 is disposed above the cylindrical portion 331. A first seal groove 333 is formed on the circumference, between the cylindrical portion 331 and the first land portion 332. A seal gasket 34 formed of a synthetic rubber material is mounted thereon inside the first seal groove 333. The seal gasket 34 demonstrates a sealing function between the outer peripheral surface of the valve shaft 33 and the inner peripheral surface of the shaft support portion 311e so as to prevent water or foreign matter from permeating the motor assembly 32.

A connection portion 334 having a diameter smaller than that of the cylindrical portion 331 is integrally formed in a distal end portion of the valve shaft 33. Similar to the air pressure regulating valve 4, the connection portion 334 is formed in a width-across flat shape which has a pair of flat surfaces 334a opposing on an outer peripheral surface.

A ball hole 335 penetrates the connection portion 334 in a direction orthogonal to the axis. Both end portions of the ball hole 335 are respectively open so as to be orthogonal to the opposing flat surfaces 334a. A steel ball 336 is arranged inside the ball hole 335 so as to be rotatable and movable in the axial direction of the ball hole 335. A dimensional relationship among the connection portion 334, the ball hole 335, and the steel ball 336 is set to be the same as that in the case of the above-described air pressure regulating valve 4.

Similar to the air pressure regulating valve 4, the valve member 35 (corresponding to a valve body) is attached to the connection portion 334. A valve frame 351 of the valve member 35 has a flat plate portion 351a which radially extends in a disk shape with respect to the axis of the valve shaft 33. A seal member 352 formed of a synthetic rubber material is applied to the flat plate portion 351a so as to cover an outer peripheral surface thereof (upper surface and outer peripheral edge).

A seal lip 352a which can come into contact with the control valve seat 312b formed in the second body 312 in response to descending of the valve member 35 protrudes on a lower surface of the seal member 352. As illustrated in FIG. 3, the seal lip 352a is formed radially outward so that self-sealing is performed by negative pressure generated by reaction between the hydrogen gas and the oxygen which remain inside the cell stack 6.

Furthermore, a wall portion 352*b* configured to be similar to the above-described wall portion 452*b* is formed on an upper surface (corresponding to the other side surface opposite to one surface) of the seal member 352. The wall portion 352*b* is formed in an upper surface edge portion of the seal member 352 corresponding to a portion R2*a* where the liquid inside the flow path R2 collects due to the weight thereof, within a portion having the control valve seat 312*b* in the flow path R2 of the valve housing 31. When an attachment position (attachment angle) of the three-way valve 3 is determined in advance, it is preferable to form the wall portion 352*b* in a place corresponding to (coping with) the portion R2*a* where the water collects when the vehicle is parked on a horizontal plane.

Furthermore, an annular convex portion 352*c* disposed coaxially with the valve shaft 33 inside the wall portion 352*b* is formed on the upper surface of the seal member 352. The upper surface of the annular convex portion 352*c* can come into contact with a bypass valve seat 311*d* formed in the first body 311 in response to ascending of the valve member 35. When the convex portion 352*c* is in contact with the bypass valve seat 311*d*, the annular convex portion 352*c* is configured so that the wall portion 352*b* does not come into contact with an inner wall surface of the flow path R2 (inner wall surface at an upper position of the wall portion 352*b*).

A concave portion 351*b* recessed in a distal end direction of the valve shaft 33 is formed in a radial center portion of the flat plate portion 351*a*, in the valve frame 351. In addition, the valve frame 351 has a cylindrical portion 351*c* whose one end is continuous with an inner peripheral end of the concave portion 351*b*. The cylindrical portion 351*c* extends in a direction perpendicular to the flat plate portion 351*a*, and the cylindrical portion 331 of the valve shaft 33 is inserted into the cylindrical portion 351*c*.

Furthermore, similar to the air pressure regulating valve 4, the valve frame 351 has an attachment portion 351*d* which is formed to be continuous with the other end of the cylindrical portion 351*c* and receives the connection portion 334 of the valve shaft 33. The attachment portion 351*d* crimps the steel ball 336 protruding from the ball hole 335, and is fixed to the steel ball 336 so as not to be detachable.

In FIG. 3, within configurations formed in the attachment portion 351*d* in order to attach the valve member 35 (valve frame 351) to the valve shaft 33, reference numerals for configurations the same as those of the air pressure regulating valve 4 are intentionally omitted.

Similar to the air pressure regulating valve 4, in a state where the valve frame 351 is attached to the valve shaft 33, a radial gap ε with respect to the axis of the valve shaft 33 is formed on the entire periphery, between the inner peripheral surface of the cylindrical portion 351*c* and the outer peripheral surface of the cylindrical portion 331 of the valve shaft 33.

In the valve shaft 33, a second land portion 337 having a diameter the same as that of the cylindrical portion 331 is disposed above the above-described connection portion 334. A second seal groove 338 is circumferentially formed between the lower end of the cylindrical portion 331 and the second land portion 337. A ring-shaped shaft seal 36 formed of a synthetic rubber material is mounted thereon inside the second seal groove 338. The shaft seal 36 demonstrates a sealing function between the outer peripheral surface of the valve shaft 33 and the inner peripheral surface of the cylindrical portion 351*c* of the valve frame 351 so as to prevent water or foreign matter from permeating the cylindrical portion 351*c* of the valve frame 351 and the attachment portion 351*d*.

A valve spring 37 is interposed between the concave portion 351*b* of the valve frame 351 and the inner upper surface of the first body 311. The inner peripheral surface of the valve spring 37 is fitted and attached to the outer peripheral surface of the above-described shaft support portion 311*e*. The valve spring 37 is elastically mounted between the valve frame 351 and the first body 311, and biases the valve member 35 in the distal end direction of the valve shaft 33. A biasing force of the valve spring 37 causes the valve member 35 not to deviate from the axis of the valve shaft 33 (centering), and so as not to be tilted from the axis of the valve shaft 33 which serves as the center.

Next, an operation of the three-way valve 3 will be briefly described. When the valve shaft 33 is present above, the upper surface of the convex portion 352*c* of the seal member 352 of the valve member 35 sits on (comes into contact with) the bypass valve seat 311*d* and is spaced (separated; not illustrated) away from the control valve seat 312*b*. In this case, the three-way valve inlet 311*a* and the three-way valve outlet 312*a* communicate with each other, and the circulation of the fluid such as air is allowed therebetween. The communication between the three-way valve inlet 311*a* and the three-way valve outlet 312*a*, and the bypass port 311*b* is blocked, and the circulation of the fluid is blocked therebetween.

If the stepping motor is rotated in one direction by a drive signal transmitted from the control device 9, the valve member 35 descends in the axial direction together with the valve shaft 33, and the upper surface of the convex portion 352*c* of the seal member 352 is separated from the bypass valve seat 311*d* and the seal lip 352*a* sits on (comes into contact with; refer to FIG. 3) the control valve seat 312*b*. In this case, the three-way valve inlet 311*a* and the bypass port 311*b* communicate with each other, and the circulation of the fluid such as the air is allowed therebetween. The communication between the three-way valve inlet 311*a* and the bypass port 311*b*, and the three-way valve outlet 312*a* is blocked, and the circulation of the fluid is blocked therebetween.

In the three-way valve 3, the valve member 35 is located at any optional position between the control valve seat 312*b* and the bypass valve seat 311*d*. In this manner, based on a cross-sectional area of the path through which the fluid passes, it is possible to control flow rates of the fluid supplied from the three-way valve inlet 311*a*, which respectively diverges to the three-way valve outlet 312*a* and the bypass port 311*b*.

In this case, when the valve member 35 is located at a valve opened position, the wall portion 352*b* is formed so that the cross-sectional area of the flow path between the wall portion 352*b* and the inner wall surface of the flow path R2 has a predetermined value or more. The predetermined value is a value in which a pressure loss has a predetermined value or less when the valve member 35 is located at the valve opened position. According to this configuration, when the three-way valve 3 (fluid control valve) is in the valve opened state, in the flow path between the wall portion 352*b* and the inner wall of the flow path R2, the cross-sectional area of the flow path which has the predetermined value or more can be reliably secured. Accordingly, it is possible to minimize the pressure loss.

Furthermore, an operation of the three-way valve 3 when frozen will be described with reference to FIG. 5. The left side drawing illustrates the three-way valve 3 without the wall portion 352b, and the right side drawing illustrates the three-way valve 3 with the wall portion 352b. Both drawings illustrate a state where the three-way valve 3 (valve shaft 33) illustrated in FIG. 3 is tilted to the left side and is attached to the vehicle.

Similar to the above description of the operation of the air pressure regulating valve 4 when frozen, while the fuel cell system is stopped, the water droplets present inside the flow path R2 after the air scavenging are caused to flow toward the lower portion in the flow path R2 due to the weight thereof, and are collected at the water collected portion R2a. In this case, when the wall portion 352b is not formed as illustrated on the left side in FIG. 5, water W collected in the water collected portion R2a permeates onto at least a portion of the upper surface of the valve member 35, that is, the upper surface of the valve frame 351 and the seal member 352. That is, the water W covers a portion of the upper surface of the valve member 35. If in this state, the ambient temperature becomes low and the water W collected in the water collected portion R2a freezes, the portion of the upper surface of the valve member 35 becomes covered with ice.

On the other hand, when the wall portion 352b is formed as illustrated on the right side in FIG. 5, the wall portion 352b does not allow the water W collected in the water collected portion R2a to permeate onto the upper surface of the valve member 35, that is, the upper surface of the valve frame 351 and the seal member 352. That is, it is possible to prevent the water W from covering the upper surface of the valve member 35. Therefore, even when the ambient temperature becomes low and the water W collected in the water collected portion R2a freezes, it is possible to prevent the upper surface of the valve member 35 from being covered with ice.

Accordingly, it is not necessary to dispose a large-sized and expensive drive device whose drive force is relatively strong. Therefore, it is possible to maintain excellent opening performance of the three-way valve 3 (fluid control valve) by using a small-sized and inexpensive drive device whose drive force is relatively weak as in the related art so as to operate the frozen and stuck valve member 35.

According to the embodiment disclosed here, when the valve housings 31 and 41 are attached to the attachment portion 11a (attachment target member) in a state where the valve shafts 33 and 44 (valve shaft) are tilted with respect to the horizontal plane, if the liquid (for example, water) inside the flow paths R1 and R2 collects in a portion (for example, the lowest portion) of the flow paths R1 and R2 while the valve members 35 and 45 (valve body) are in contact with (sit on) the control valve seat 312b or the pressure regulating valve seat 411f (valve seat), the wall portions 352b and 452b formed on the other side surface (upper surface) of the valve members 35 and 45 (valve body) can prevent the collected water from spilling over (permeating onto the other side surface (upper surface) of the valve body) the upper surface portion of the valve members 35 and 45 (valve body). Accordingly, even when the collected water W freezes, it is not necessary to dispose a large-sized and expensive drive device whose drive force is relatively strong. Therefore, it is possible to maintain excellent opening performance of the fluid control valve by using a small-sized and inexpensive drive device whose drive force is relatively weak as in the related art so as to operate the frozen and stuck valve members 35 and 45 (valve body).

The valve housings 31 and 41 have the grooves 312c and 411g which are formed on the outer periphery of the control valve seat 312b or the pressure regulating valve seat 411f (valve seat) over the entire periphery.

According to this configuration, it is possible to increase a water storage amount in the water collected portions R1a and R2a in the flow paths R1 and R2 of the valve housings 31 and 41 by a volume of the grooves 312c and 411g. Therefore it is possible to minimize the amount of the water in the water collected portions R1a and R2a. Consequently, it is possible to further prevent the collected water W from spilling over the upper surface portion of the valve members 35 and 45 (valve body) (permeating onto the other side surface (upper surface) of the valve body).

The pressure regulating valve 4 (fluid control valve) further includes the diaphragm 46 which moves with the valve member 45 (valve body). One side of the diaphragm 46 is configured to include the flow path and the valve seat and faces the fluid chamber 414 in which the fluid is circulated. The other side of the diaphragm 46 faces the air chamber 415 where the fluid is prohibited from entering and which is open to the atmosphere. The effective pressure receiving area of the diaphragm 46 is larger than the effective pressure receiving area of the valve body.

According to this configuration, even in the air pressure regulating valve 4 (fluid control valve) further including the diaphragm 46 which moves with the valve member 45 (valve body), the above-described operational effect can be obtained.

When the valve members 35 and 45 (valve body) are located at the valve opened position, the wall portions 352b and 452b are formed so that the cross-sectional area of the flow path between the wall portions 352b and 452b, and the inner wall of the flow paths R1 and R2 has a predetermined value or more.

According to this configuration, when the three-way valve 3 and the air pressure regulating valve 4 (fluid control valve) are in the valve opened state, with the flow path between the wall portions 352b and 452b, and the inner wall of the flow paths R1 and R2, the cross-sectional area of the flow path which has the predetermined value or more can be reliably secured. Therefore, it is possible to minimize the pressure loss.

Figure 6:
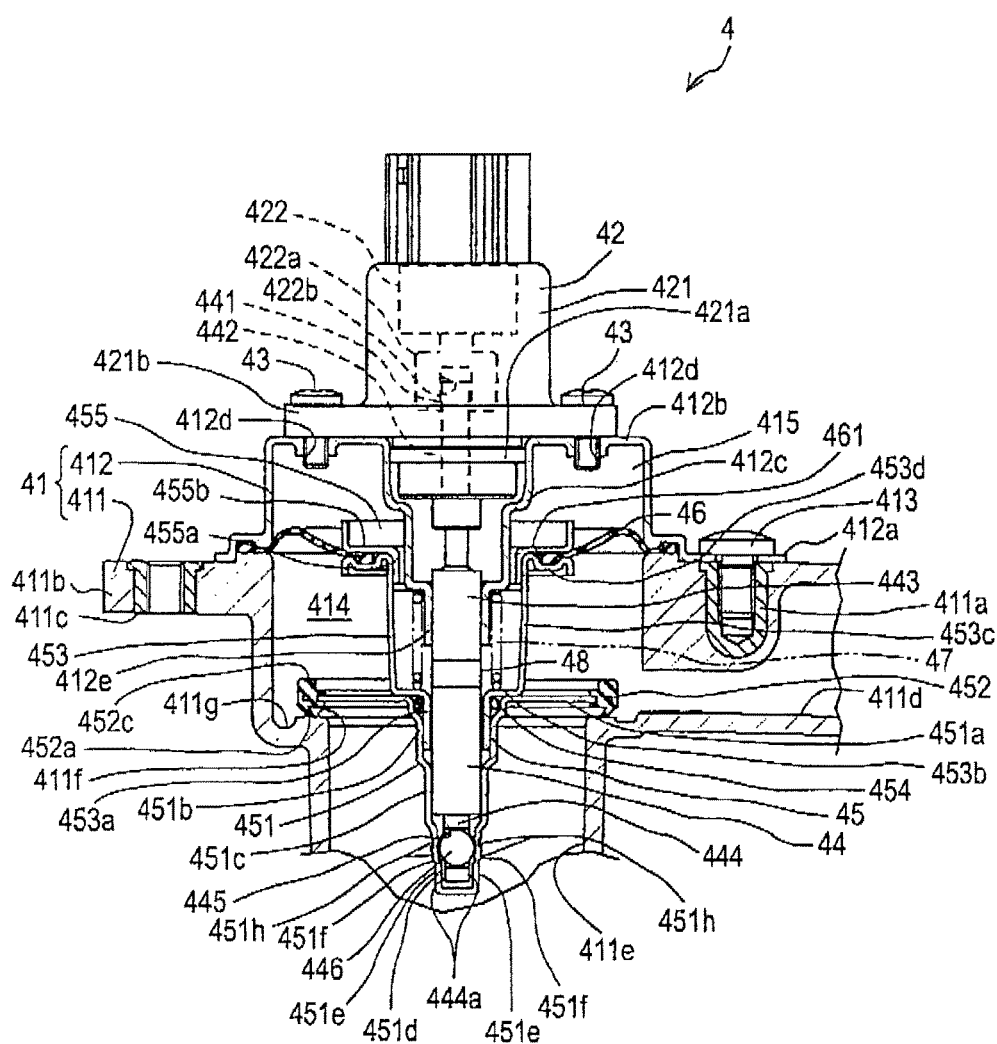
FIG. 6 is a cross-sectional view for illustrating a modification example of the air pressure regulating valve illustrated in FIG. 2.

In the above-described embodiment, the wall portion 452b (or 352b) is disposed in the place corresponding to the water collected portion R1a within the upper surface edge portion of the seal member 452 (or the water collected portion R2a within the upper surface edge portion of the seal member 352). However, as illustrated in FIG. 6, the wall portion 452c may be formed over the entire periphery of the upper surface edge portion of the seal member 452.

According to this configuration, when the water falls on the upper surface of the valve members 35 and 45 (valve body) from the inner wall of the flow path above the other side surface (upper surface) of the valve members 35 and 45 (valve body), the falling water is stored on the upper surface of the valve body by the wall portion 452c formed on the entire surface of the edge portion of the valve members 35 and 45 (valve body). Therefore, it is possible to minimize an amount of the water in the water collected portion R1a and R2a of the flow paths R1 and R2 of the valve housings 31 and 41. Consequently, it is possible to further prevent the collected water W from spilling over the upper surface portion of the valve members 35 and 45 (valve body) (permeating onto the other side surface (upper surface) of the valve body).

When the valve members 35 and 45 (valve body) are assembled to the valve housings 31 and 41, as described above, it is possible to omit the positioning process for positioning the wall portions 352b and 452b at a predetermined position (position corresponding to the water collected portions R1a and R2a). Consequently, it is possible to facilitate the attachment of the valve members 35 and 45 (valve body).

Furthermore, in some cases, the water collected portion varies depending on the tilting angle of the parked vehicle. However, the wall portion 452c is disposed on the entire periphery of the upper surface edge of the valve members 35 and 45 (valve body). Therefore, even when the collected water freezes when the water collected portion has varied, it is not necessary to dispose a large-sized and expensive drive device whose drive force is relatively strong. Therefore, it is possible to open and close the fluid control valve by using a small-sized and inexpensive drive device whose drive force is relatively weak as in the related art so as to operate the frozen and stuck valve body.

A first aspect of this disclosure is directed to a fluid control valve including a valve housing in which a flow path having a gas inlet and a gas outlet is formed, a drive device attached to the valve housing, a valve shaft which is connected to an output shaft of the drive device and moves in an axial direction in the valve housing, and a valve body which is attached so as to radially extend to an axis of the valve shaft, and which opens and closes the flow path by being moved with the valve shaft so that one side surface moves away from or comes into contact with a valve seat formed in the flow path of the valve housing. The valve housing is attached to an attachment target member so that the valve shaft is tilted to a horizontal plane. The valve body includes a wall portion which corresponds to a portion where a liquid inside the flow path collects due to the weight thereof, within a portion having the valve seat in the flow path of the valve housing, and which is formed along an edge portion on the other side surface opposite to one side surface of the valve body.

According to this aspect of this disclosure, when the valve housing is attached to the attachment target member in a state where the valve shaft is tilted to the horizontal plane, if the liquid (for example, water) inside the flow path collects in a portion (for example, the lowest portion) of the flow path while the valve body is in contact with (sits on) the valve seat, the wall portion formed on the other side surface (upper surface) of the valve body can prevent the collected water from spilling over an upper surface portion of the valve body (permeating onto the other side surface (upper surface) of the valve body). Accordingly, even when the collected water freezes, it is not necessary to dispose a large-sized and expensive drive device whose drive force is relatively strong. Therefore, it is possible to maintain excellent opening performance of the fluid control valve by using a small-sized and inexpensive drive device whose drive force is relatively weak as in the related art so as to operate the frozen and stuck valve body.

A second aspect of this disclosure is directed to the fluid control valve according to the first aspect of this disclosure, wherein the wall portion is formed over an entire periphery of the edge portion on the other side surface of the valve body.

According to this configuration, when the water falls on the upper surface of the valve body from the inner wall of the flow path above the other side surface (upper surface) of the valve body, the falling water is stored on the upper surface of the valve body by the wall portion formed on the entire periphery of the edge portion of the valve body. Therefore, it is possible to minimize an amount of the water collected in a portion (for example, the lowest portion) of the flow path of the valve housing. Consequently, it is possible to further prevent the collected water from spilling over the upper surface portion of the valve body (permeating onto the other side surface (upper surface) of the valve body). In addition, when the valve body is assembled to the valve housing, it is possible to omit a positioning process for positioning the wall portion at a predetermined position (position corresponding to a water collected portion). Consequently, it is possible to facilitate the attachment of the valve body (furthermore, the water collected portion varies depending on a tilting angle of a parked vehicle. However, even when the collected water freezes at this time, it is not necessary to dispose a large-sized and expensive drive device whose drive force is relatively strong. Therefore, it is possible to open the fluid control valve by using a small-sized and inexpensive drive device whose drive force is relatively weak as in the related art so as to operate the frozen and stuck valve body).

A third aspect of this disclosure is directed to the fluid control valve according to the first or second aspect of this disclosure, wherein the valve housing has a groove which is formed on an outer periphery of the valve seat over an entire periphery.

According to this configuration, it is possible to increase a water storage amount in a water collected portion of the water present in a portion (for example, the lowest portion) of the flow path of the valve housing by a volume of the groove. Therefore, it is possible to minimize the amount of the water in the water collected portion. Consequently, it is possible to further prevent the collected water from spilling over the upper surface portion of the valve body (permeating onto the other side surface (upper surface) of the valve body).

A fourth aspect of this disclosure is directed to the fluid control valve according to any one of the first to third aspects of this disclosure, wherein the fluid control valve further includes a diaphragm which moves with the valve body, one side of the diaphragm faces a fluid chamber which is configured to include the flow path and the valve seat and in which the fluid is circulated, and the other side of the diaphragm faces an air chamber where the fluid is prohibited from entering and which is open to the atmosphere, and an effective pressure receiving area of the diaphragm is larger than an effective pressure receiving area of the valve body.

According to this configuration, the fluid control valve further including the diaphragm which moves with the valve body can also obtain the above-described operational effects.

A fifth aspect of this disclosure is directed to the fluid control valve according to any one of the first to fourth aspects of this disclosure, wherein the wall portion is formed so that a flow path cross-sectional area between the wall portion and an inner wall of the flow path has a predetermined value or more when the valve body is located at a valve opening position.

According to this configuration, when the fluid control valve is in an opened state, in the flow path between the wall portion and the inner wall of the flow path, the flow path cross-sectional area having the predetermined value or more can be reliably secured. Therefore, it is possible to minimize a pressure loss.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fluid control valve comprising:
a valve housing including a first flow path between a fluid inlet and a fluid outlet and a second flow path between the fluid inlet and a bypass port;
a drive device attached to the valve housing;
a valve shaft which is connected to an output shaft of the drive device and moves in an axial direction in the valve housing; and
a valve body which is attached so as to radially extend to an axis of the valve shaft, and which opens and closes the first and second flow paths by being moved with the valve shaft so that one side surface moves away from or comes into contact with a first valve seat formed in the first flow path of the valve housing and an other side surface opposite to the one side surface moves away from or comes into contact with a second valve seat formed in the second flow path,
wherein the valve housing is attached to an attachment target member so that the valve shaft is tilted to a horizontal plane, and
wherein the valve body includes a wall portion which corresponds to a portion where a liquid inside the first flow path collects due to weight thereof, within a portion having the first valve seat in the first flow path of the valve housing, and which is formed along an edge portion on the other side surface so as to restrict the liquid from covering an upper surface of the valve body.

2. The fluid control valve according to claim 1, wherein the wall portion is formed over an entire periphery of the edge portion on the other side surface of the valve body.

3. The fluid control valve according to claim 1, wherein the valve housing has a groove which is formed on an outer periphery of the first valve seat over an entire periphery.

4. The fluid control valve according to claim 1, wherein the wall portion is formed so that a flow path cross-sectional area between the wall portion and an inner wall of the flow path is at least a predetermined value when the valve body is located at a valve opening position.

5. The fluid control valve according to claim 1, wherein the other side surface includes an annular convex portion that contacts the second valve seat, the annular convex portion being radially inward from the wall portion.

6. The fluid control valve according to claim 1, wherein the valve body includes a valve frame formed by a metal plate, the valve frame including a flat plate portion radially extending to the axis of the valve shaft in a disk shape,
wherein a seal member fixedly adheres to the flat plate portion so as to cover an outer peripheral edge, and
wherein the wall portion is provided at the seal member.

7. The fluid control valve according to claim 6, wherein the seal member is formed of a synthetic rubber material.

* * * * *